United States Patent
Gao et al.

(10) Patent No.: US 9,804,986 B2
(45) Date of Patent: Oct. 31, 2017

(54) DEVICE FOR SWITCHING BETWEEN COMMUNICATION MODES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yang Gao, Shenzhen (CN); Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 261 days.

(21) Appl. No.: 14/788,149

(22) Filed: Jun. 30, 2015

(65) Prior Publication Data

US 2016/0335212 A1    Nov. 17, 2016

(30) Foreign Application Priority Data

May 11, 2015    (CN) .......................... 2015 1 0235267

(51) Int. Cl.
*G06F 13/40* (2006.01)
*G06F 13/42* (2006.01)
*G06F 13/38* (2006.01)
*G06F 3/06* (2006.01)

(52) U.S. Cl.
CPC ........ *G06F 13/4022* (2013.01); *G06F 3/0661* (2013.01); *G06F 13/387* (2013.01); *G06F 13/4068* (2013.01); *G06F 13/4282* (2013.01)

(58) Field of Classification Search
CPC .. G06F 3/0661; G06F 13/387; G06F 13/4022; G06F 13/4068; G06F 13/4282; G06F 2213/0002; G06F 2213/0042
See application file for complete search history.

(56) References Cited

U.S. PATENT DOCUMENTS

2004/0143693 A1* 7/2004 Hwang ................. G06F 13/385
710/305

FOREIGN PATENT DOCUMENTS

| CN | 203104527 U | * | 7/2013 |
| CN | 204069101 U | * | 12/2014 |
| CN | 204229835 U | * | 3/2015 |

* cited by examiner

*Primary Examiner* — Glenn A Auve
(74) *Attorney, Agent, or Firm* — Steven Reiss

(57) ABSTRACT

A switching device able to switch between communication modes includes a processor, a universal serial bus (USB) communication module, a serial communication module, and a control module. When a USB interface of the USB communication module is electrically coupled to a first electronic device, the control module outputs a first control signal to a control chipset of the serial communication module. The control chipset of the serial communication module is turned off. The processor can communicate with the first electronic device through the USB communication module.

6 Claims, 2 Drawing Sheets

DEVICE FOR SWITCHING BETWEEN COMMUNICATION MODES

FIELD

The subject matter herein generally relates to communications.

BACKGROUND

Electronic devices can be configured to communicate with other devices. In some electronic devices an external communication interface can be included. Common external communication interfaces include a serial port such as Recommend Standard number 232 (RS-232) and universal serial bus (USB).

BRIEF DESCRIPTION OF THE DRAWINGS

Implementations of the present technology will now be described, by way of example only, with reference to the attached figures.

DETAILED DESCRIPTION

Figure 1:
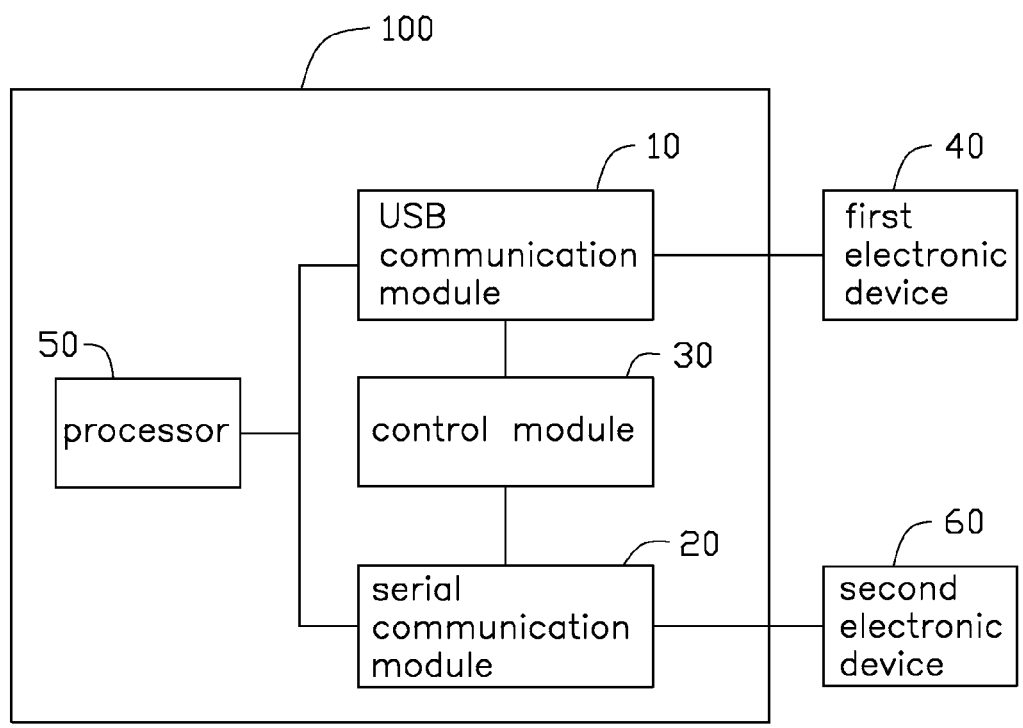
FIG. 1 is a block diagram of an embodiment of a communication switching device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a communication switch device 100 of the present disclosure. The communication switch device 100 can comprise a universal serial bus (USB) communication module 10, a serial communication module 20, a control module 30, and a processor 50. Both the USB communication module 10 and the serial communication module 20 are electrically coupled to the processor 50. Both the USB communication module 10 and the serial communication module 20 are further electrically coupled to the control module 30.

Figure 2:
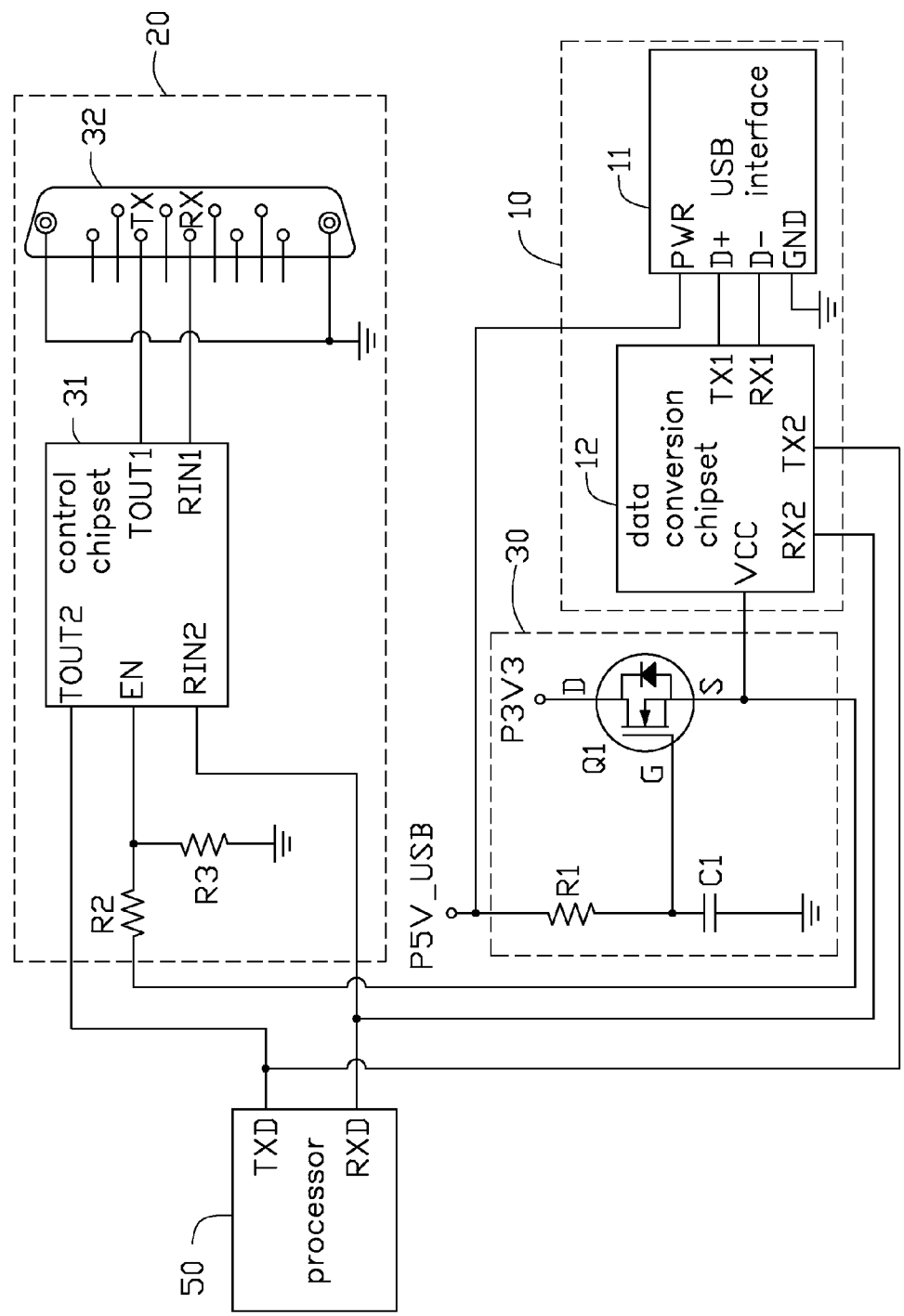
FIG. 2 is a circuit diagram of the communication switching device of FIG. 1.

FIG. 2 illustrates a circuit diagram of an embodiment of the communication switching device 100. The USB communication module 10 can comprise a USB interface 11 and a data conversion chipset 12. The USB interface 11 is configured to be electrically coupled to a USB interface of a first electronic device 40 (shown in FIG. 1). The data conversion chipset 12 is configured to transmit data between the processor 50 and the USB interface of the first electronic device 40 through the USB interface 11. A ground pin GND of the USB interface 11 is electrically coupled to a ground. A power supply pin PWR of the USB interface 11 is electrically coupled to the control module 30. A first data pin D+ of the USB interface 11 is electrically coupled to a first transmission data pin TX1 of the data conversion chipset 12. A second data pin D− of the USB interface 11 is electrically coupled to a first receiving data pin RX1 of the data conversion chipset 12. A second transmission data pin TX2 of the data conversion chipset 12 is electrically coupled to a first transmission pin TXD of the processor 50. A second receiving data pin RX2 of the data conversion chipset 12 is electrically coupled to a first receiving pin RXD of the processor 50. A power pin VCC of the data conversion chipset 12 is electrically coupled to the control module 30.

The serial communication module 20 can comprise a control chipset 31, a serial interface 32, and two resistors R2 and R3. The serial interface 32 is configured to be electrically coupled to a serial interface of a second electronic device 60 (shown in FIG. 1). The control chipset 31 is configured to transmit data between the processor 50 and the serial interface of the electronic device 60 through the serial interface 32. An enable pin EN of the control chipset 31 is electrically coupled to the control module 30 through the resistor R2, and is electrically coupled to a ground through the resistor R3. A first transmission data pin TOUT1 of the control chipset 31 is electrically coupled to a transmission data pin TX of the serial interface 32. A first receiving data pin RIN1 of the control chipset 31 is electrically coupled to a receiving data pin RX of the serial interface 32. A second transmission data pin TOUT2 of the control chipset 31 is electrically coupled to the first transmission pin TXD of the processor 50. A second receiving data pin RIN2 of the control chipset 31 is electrically coupled to the first receiving pin RXD of the processor 50.

The control module 30 can comprise a resistor R1, a capacitor C1, and a field effect transistor (FET) Q1. The resistor R1 is electrically coupled to a ground through the capacitor C1, and is electrically coupled to the power supply pin PWR of the USB interface 11. A gate G of the FET Q1 is electrically coupled to a node between the resistor R1 and the capacitor C1. A drain D of the FET Q1 is electrically coupled to a power supply P3V3. A source S of the FET Q1 is electrically coupled to the power supply pin VCC of the data conversion chipset 12, and is electrically coupled to the enable pin EN of the control chipset 31 through the resistor R2.

In at least one embodiment, the first electronic device and the second electronic device can each be a notebook.

In use, the USB interface 11 of the communication switch device 100 is electrically coupled to the USB interface of the first electronic device 40. The USB interface of the electronic device 40 outputs a power supply P5V USB to the control module 30 through the power supply pin PWR of the USB interface 11. Thus, the FET Q1 is turned on. The control module 30 outputs a first control signal at a high-voltage level, such as logic 1, to the enable pin EN of the control chipset 31, to turn off the control chipset 31. In the meantime, the processor 50 can communicate with the USB interface of the first electronic device 40 through the USB communication module 10.

When the serial interface 32 of the communication switch device 100 is electrically coupled to the serial interface of the second electronic device 60, the FET Q1 is turned off. Thus, the control module 30 outputs a second control signal at a low-voltage level, such as logic 0, to the enable pin EN of the control chipset 31, to turn on the control chipset 31. In the meantime, the processor 50 can communicate with the serial interface of the second electronic device 60 through the serial communication module 20.

The embodiments shown and described above are only examples. Many details are often found in the art such as the other features of the communication switch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A communication switch device comprising:
a processor;
a universal serial bus (USB) communication module comprising:
  a data conversion chipset electrically coupled to the processor; and
  a USB interface electrically coupled to the data conversion chipset and configured to be electrically coupled to a first electronic device, wherein the data conversion chipset is configured for transmitting data between the processor and the first electronic device through the USB interface;
a serial communication module comprising:
  a control chipset electrically coupled to the processor; and
  a serial interface electrically coupled to the control chipset and configured to be electrically coupled to a second electronic device, wherein the control chipset is configured for transmitting data between the processor and the second electronic device through the serial interface; and
a control module electrically coupled to the USB communication module and the serial communication module, wherein the control module comprises a field effect transistor (FET), a capacitor, and a first resistor, the first resistor is electrically coupled to ground through the capacitor, and is electrically coupled to a power supply pin of the USB interface, a gate of the FET is electrically coupled to a node between the first resistor and the capacitor, a drain of the FET is electrically coupled to a first power supply, a source of the FET is electrically coupled to a power supply pin of the data conversion chipset, and is electrically coupled to serial communication module;
wherein when the USB interface is electrically coupled to the first electronic device, the control module outputs a first control signal to the control chipset of the serial communication module, the control chipset of the serial communication module is turned off, and the processor communicates with the first electronic device through the data conversion chipset and the USB interface.

2. The communication switch device of claim 1, wherein when the serial interface is electrically coupled to the second electronic device, the control module outputs a second control signal to the control chipset of the serial communication module, the control chipset of the serial communication module is turned on, the processor communicates with the second electronic device through the control chipset and the serial interface.

3. The communication switch device claim 2,
wherein when the USB interface is electrically coupled to the first electronic device, the power supply pin of the USB interface supplies power to the gate of the FET through the first resistor, the FET is turned on, the control module outputs the first control signal to the control chipset of the serial communication module, the control chipset of the serial communication module is turned off, the processor communicates with the first electronic device through the USB interface of the USB communication module.

4. The communication switch device of claim 3, wherein an enable pin of the control chipset is electrically coupled to ground through a second resistor, and is electrically coupled to the source of the FET through a third resistor, a first transmission data pin of the control chipset is electrically coupled to a transmission data pin of the serial interface, a first receiving data pin of the control chipset is electrically coupled to a receiving data pin of the serial interface.

5. The communication switch device of claim 4, wherein a first transmission data pin of the data conversion chipset is electrically coupled to a first data pin of the USB interface of the USB communication module, a first receiving data pin of the data conversion chipset is electrically coupled to a second data pin of the USB interface of the USB communication module, a ground pin of the USB interface of the USB communication module is electrically coupled to ground.

6. The communication switch device of claim 5, wherein both a second transmission data pin of the control chipset and a second send data pin of the data conversion chipset are electrically coupled to a first transmission pin of the processor, both a second receiving data pin of the control chipset and a second receiving data pin of the data conversion chipset are electrically coupled to a first receiving pin of the processor.

* * * * *